United States Patent
Dhanabalan

(10) Patent No.: US 11,036,688 B2
(45) Date of Patent: Jun. 15, 2021

(54) SHARING OF DATA WITH APPLICATIONS

(71) Applicant: Citrix Systems, Inc., Fort Lauderdale, FL (US)

(72) Inventor: Praveen Raja Dhanabalan, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 120 days.

(21) Appl. No.: 16/247,782

(22) Filed: Jan. 15, 2019

(65) Prior Publication Data

US 2020/0226101 A1    Jul. 16, 2020

(51) Int. Cl.
| | |
|---|---|
| *G06F 15/16* | (2006.01) |
| *G06F 16/176* | (2019.01) |
| *H04W 12/08* | (2021.01) |
| *H04L 29/06* | (2006.01) |
| *G06F 9/455* | (2018.01) |
| *H04W 12/06* | (2021.01) |
| *H04L 29/08* | (2006.01) |

(52) U.S. Cl.
CPC ........ *G06F 16/176* (2019.01); *G06F 9/45558* (2013.01); *H04L 63/0838* (2013.01); *H04L 65/403* (2013.01); *H04W 12/068* (2021.01); *H04W 12/08* (2013.01); *G06F 2009/45587* (2013.01); *H04L 67/06* (2013.01)

(58) Field of Classification Search
CPC .............. G06F 16/176; G06F 9/45558; G06F 2009/45587; H04W 12/0608; H04W 12/08; H04L 63/0838; H04L 65/403; H04L 67/06
USPC ........................................................ 709/206
See application file for complete search history.

(56) References Cited

U.S. PATENT DOCUMENTS

| | | | |
|---|---|---|---|
| 2010/0070628 A1* | 3/2010 | Harrang | H04L 67/322 709/224 |
| 2014/0280433 A1* | 9/2014 | Messerli | H04L 67/06 709/201 |
| 2016/0164966 A1* | 6/2016 | El Khayat | H04L 67/02 709/204 |
| 2017/0118299 A1* | 4/2017 | Kitchen | H04L 67/42 |
| 2017/0169066 A1* | 6/2017 | Mantri | H04M 3/42178 |
| 2020/0004841 A1* | 1/2020 | Tyebkhan | G06F 16/168 |

* cited by examiner

*Primary Examiner* — Alan S Chou
(74) *Attorney, Agent, or Firm* — Banner & Witcoff, Ltd.

(57) ABSTRACT

A user may, when using an application of a first computing device, intend to share data with other computing devices. To share the data, sharing processes may be performed by the first computing device, any device that the data is to be shared with, and one or more network locations. The sharing processes may determine whether the data is available at any of the devices or at any of the one or more network locations. Any device or network location where the data is available may be selected as a source of the data. Any device where the data is unavailable may be sent the data from one or more sources. Once received, the data may be stored to enable access by an application.

20 Claims, 13 Drawing Sheets

SHARING OF DATA WITH APPLICATIONS

FIELD

Aspects described herein generally relate to transfer and sharing of data with computing networks and devices. Additional aspects described herein relate to transferring and sharing data based on an enterprise mobility management system or remote access services.

BACKGROUND

When users desire to transfer or share a file with one or more other devices, they may interact various applications that allow the users to provide a location where the data can be obtained. For example, if using an email application, a user may attach the file as an email attachment or may include, within the body of an email, a uniform resource locator (URL) to a location of the file. Sharing a file in this manner may require additional steps to download or otherwise obtain the file. For example, to obtain the file, a user may, based on the email, be required to select the attachment and store the file to a device. As another example, to obtain the file, the user may, based on the URL, be required to manually access the location associated with the URL and store the file to the device (e.g., by clicking on the link and selecting a storage location for the file). The additional steps may diminish a user's experience.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations described above, and to overcome other limitations that will be apparent upon reading and understanding the present disclosure, aspects described herein relate to transferring or sharing a file, or other data, with applications installed at computing devices. Additional aspects described herein relate to transferring or sharing a file, or other data, based on an enterprise mobility management system or remote access services.

For example, a user may, when using an application of a first computing device, intend to share data with other computing devices. To share the data, sharing processes may be performed by the first computing device, any device that the data is to be shared with, and one or more network locations. The sharing processes may determine whether the data is available at any of the devices or at any of the one or more network locations. Any device or network location where the data is available may be selected as a source of the data. Any device where the data is unavailable may be sent the data from one or more sources. Once received, the data may be stored to enable access by an application. These and additional aspects will be appreciated based on discussion of the present disclosure.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
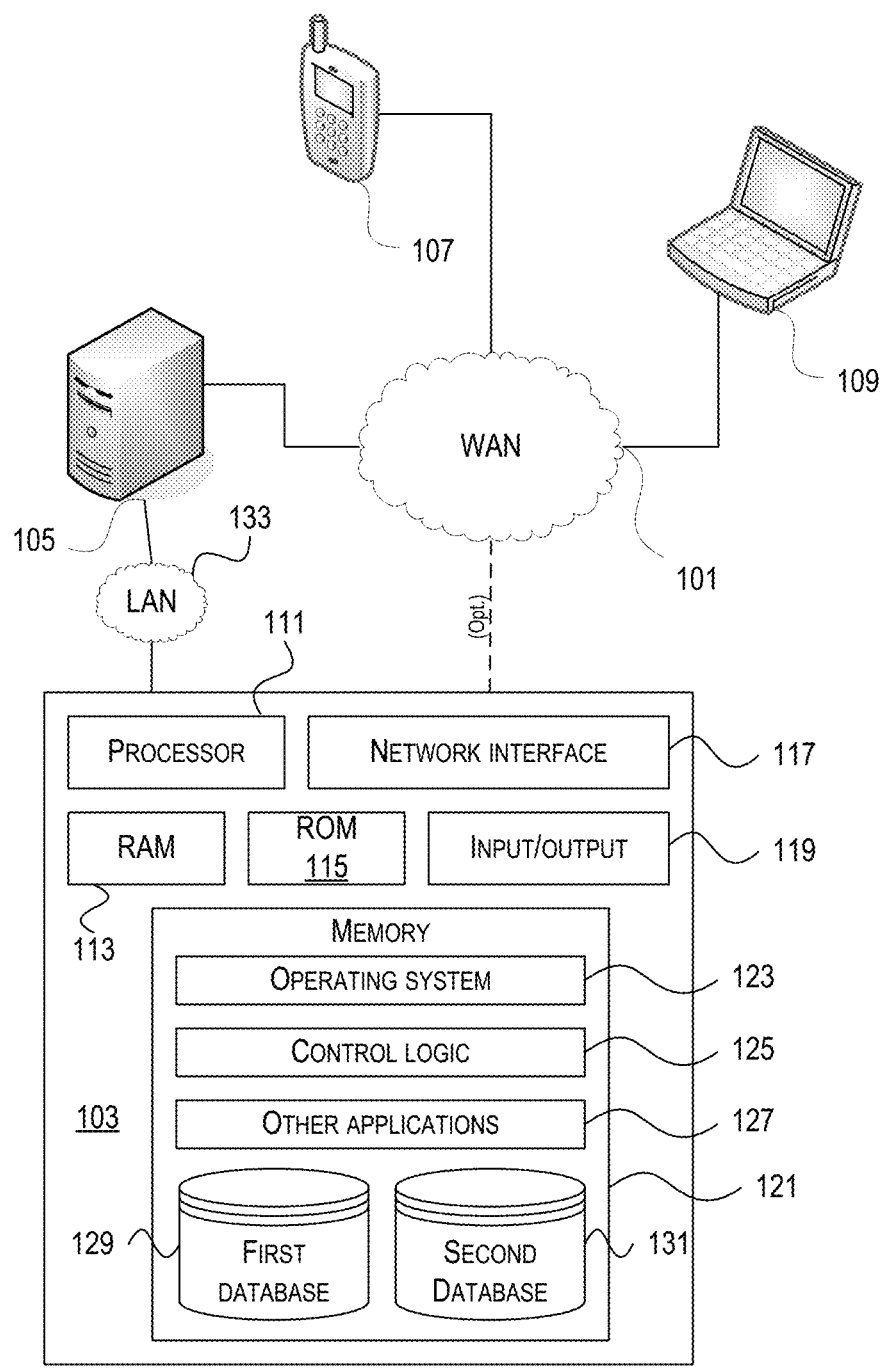
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein relate to relate to sharing a file, or other data, with computing networks and devices. Additional aspects described herein relate to sharing files based on an enterprise mobility management system, an enterprise mobility management architecture, or a management system for cloud-based or remote access services. For simplicity, an enterprise mobility management system and an enterprise mobility management architecture may be used herein interchangeably.

As mentioned above, transferring or sharing a file, or other data, may include additional steps that diminish a user's experience. Methods of transferring or sharing a file, or other data, have other drawbacks. For example, when using a URL, the location being pointed to by the URL may be one or many locations where the file, or other data, is stored. Based on current network conditions, the URL may be pointing to a sub-optimal location for obtaining the data. For example, based on a network latency, the URL may be pointing to a location that causes a slow download of the data. Thus, by failing to take advantage of network conditions that could improve the performance of sharing data, the performance of transferring or sharing data may be decreased. Thus, methods of transferring and sharing data may diminish a user's experience and may decrease the performance of transferring or sharing data. The methods, systems and apparatuses described herein provide one or more benefits to such methods of transferring and sharing of files or other data, and may improve a user's experience and may increase the performance of transferring or sharing data.

For example, a user may, when using an application of a first computing device, intend to share data with other computing devices. To share the data, sharing processes may be performed by the first computing device, any device that the data is to be shared with, and one or more network locations. The sharing processes may determine whether the data is available at any of the devices or at any of the one or more network locations. Any device or network location where the data is available may be selected as a source of the data. Any device where the data is unavailable may be sent the data from one or more sources. Once received, the data may be stored to enable access by an application.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Computer software, hardware, and networks may be utilized in a variety of different system environments, including standalone, networked, remote access (e.g., allowing devices to access a desktop or other application remotely), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
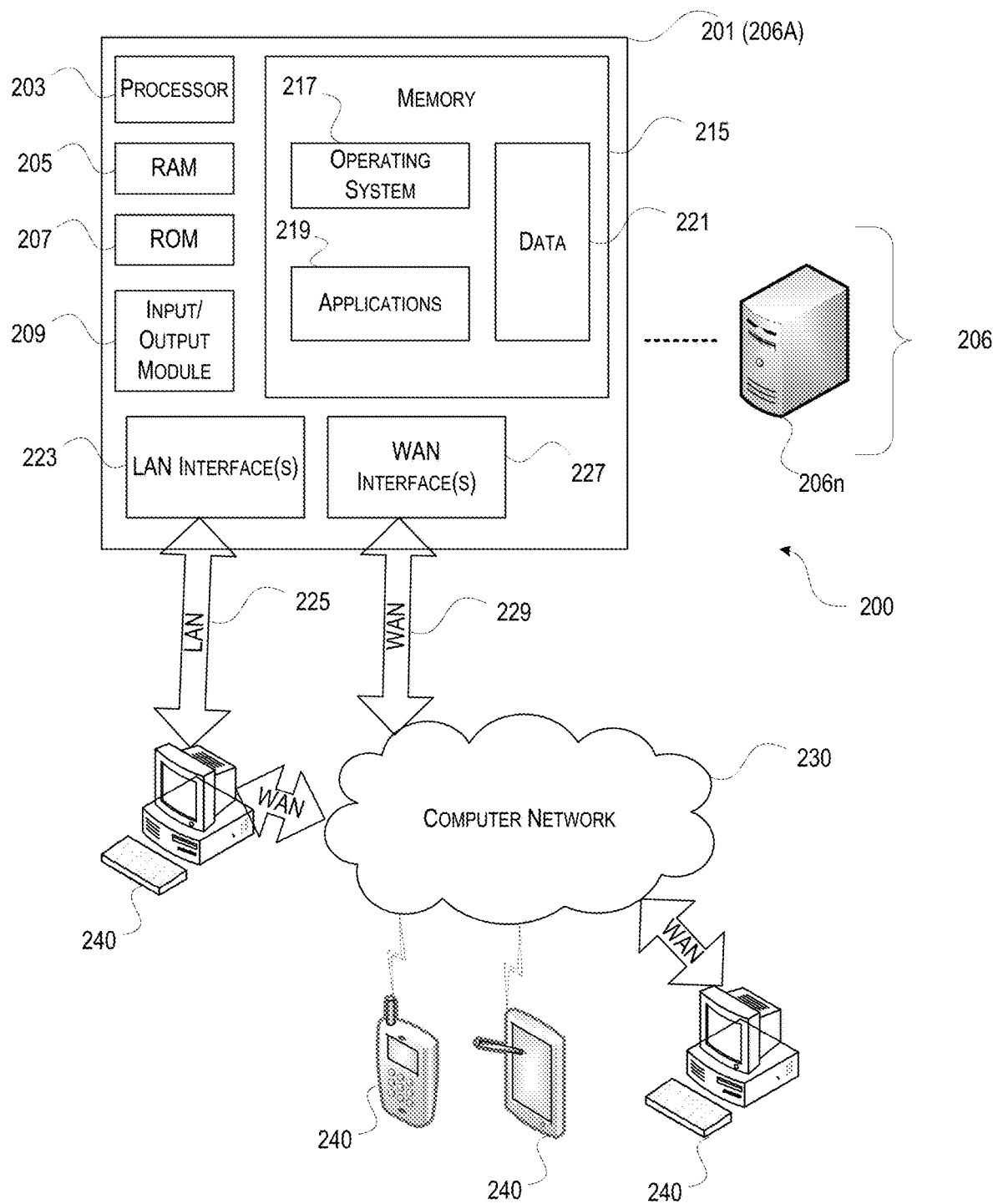
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server 206a and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
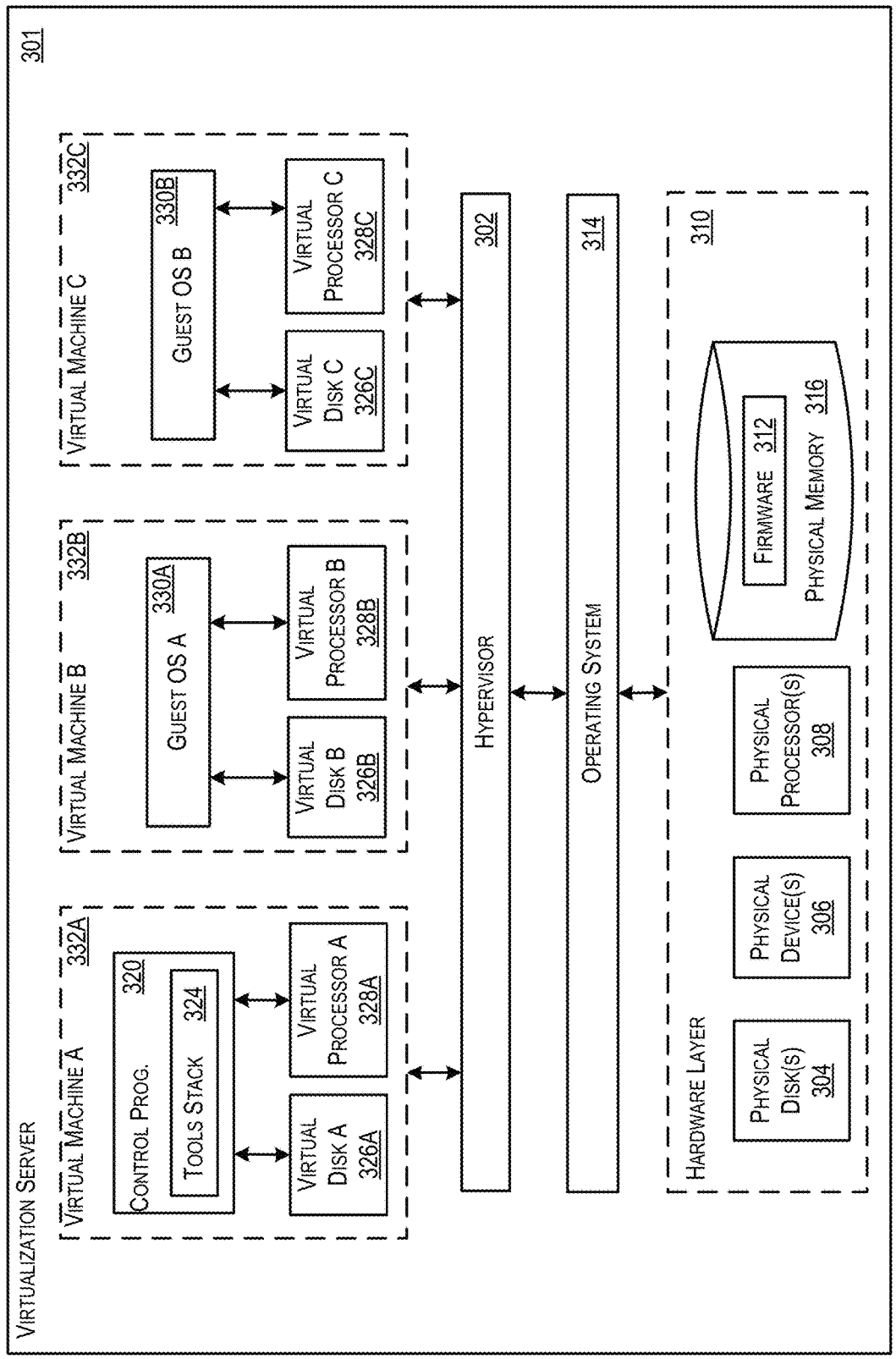
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
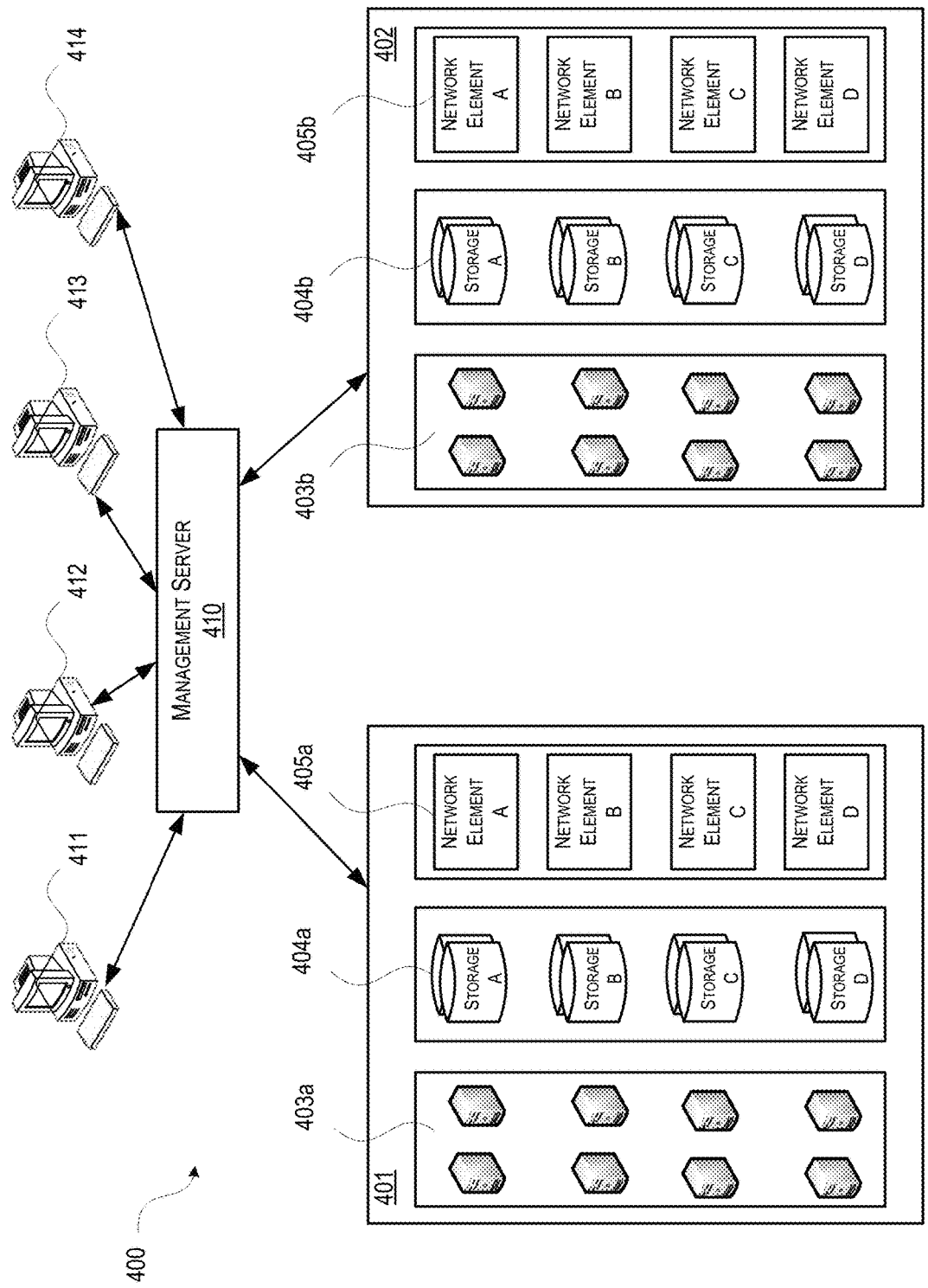
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
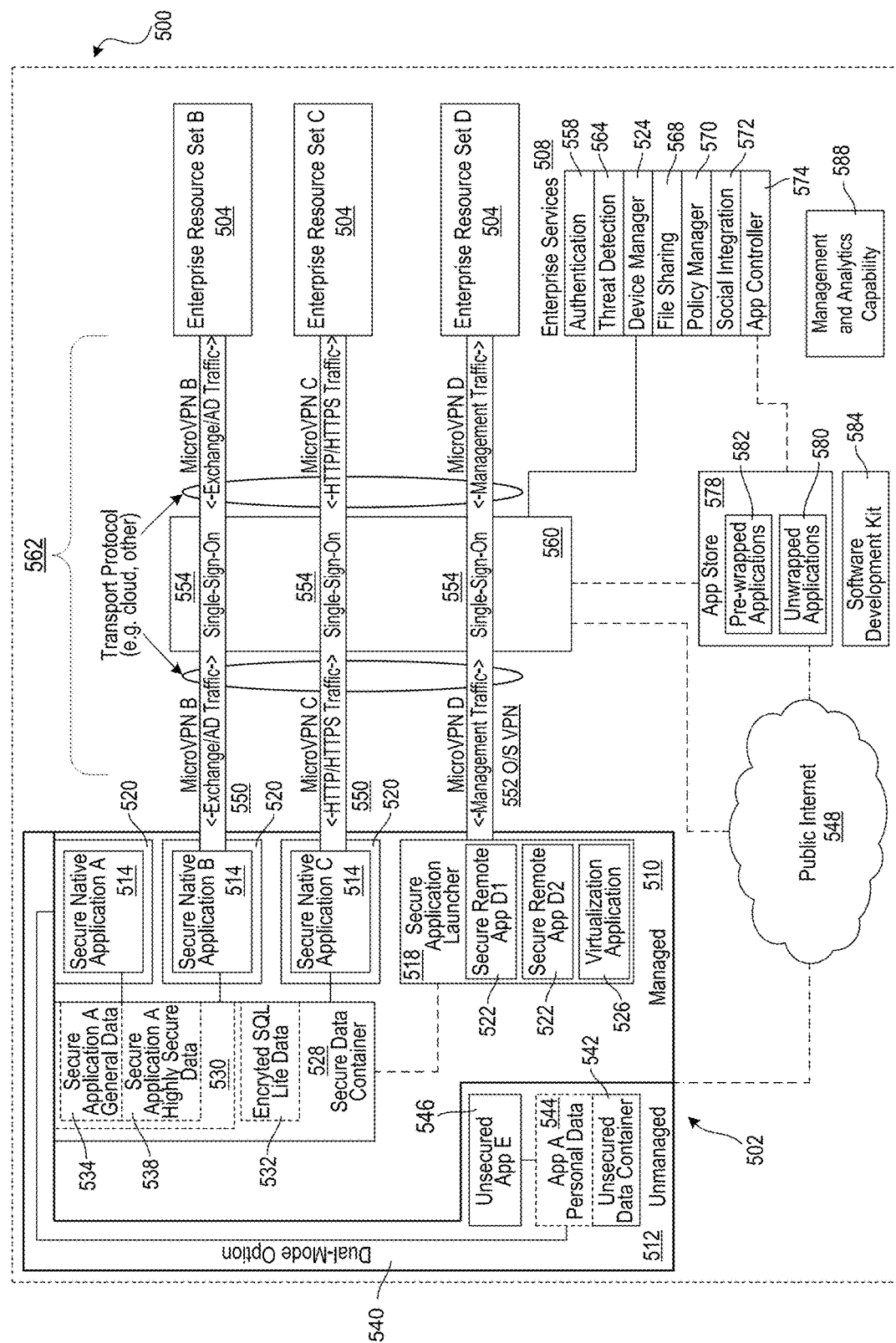
FIG. 5 depicts an illustrative enterprise mobility management system that may be used in accordance with one or more illustrative aspects described herein.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container 528 may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway 560 via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway

560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
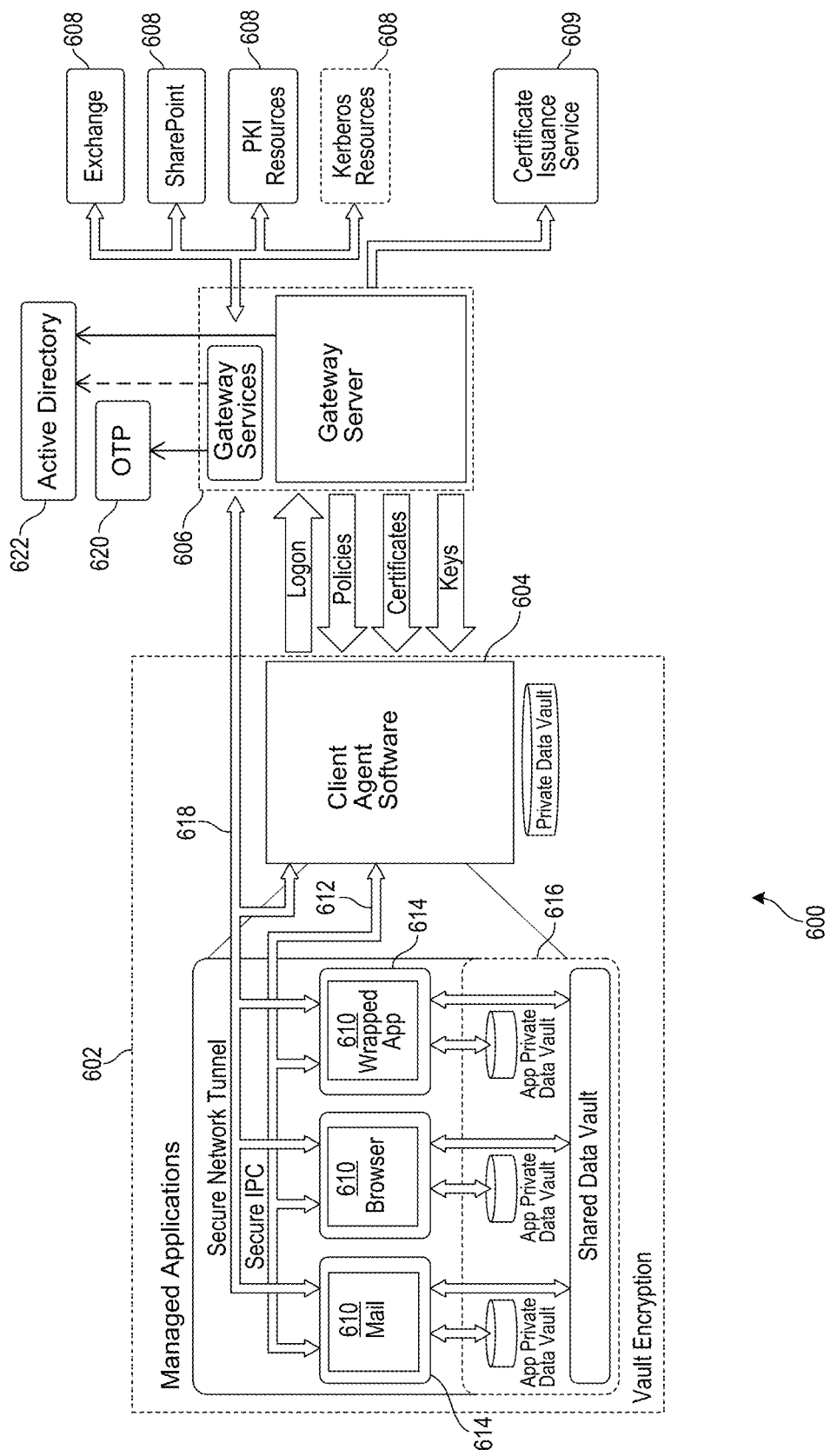
FIG. 6 depicts another illustrative enterprise mobility management system that may be used in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PM protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through gateway server 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PM protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Sharing Data

Figure 7:
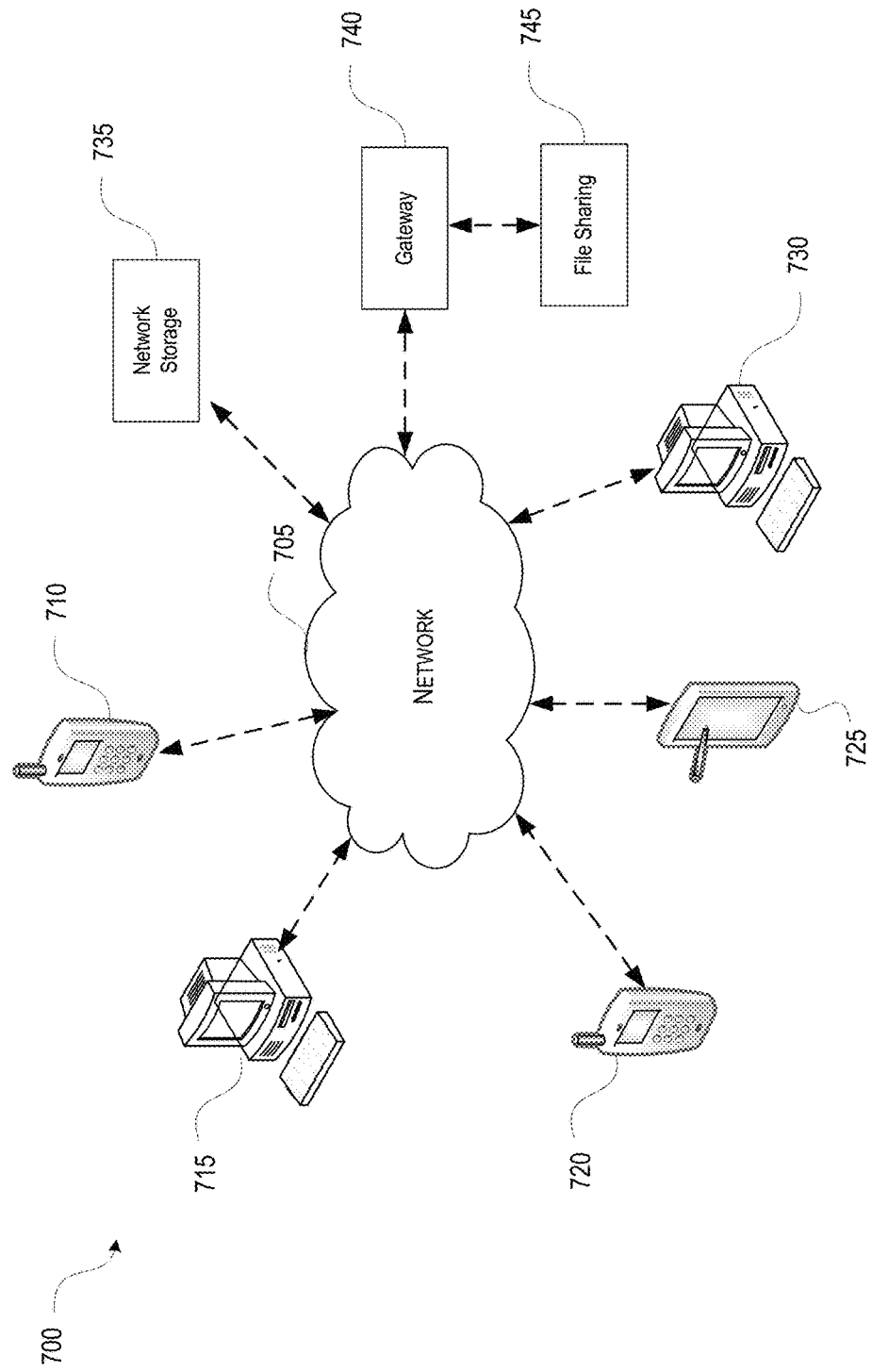
FIG. 7 depicts an example block diagram for sharing data with various computing devices that may be used in accordance with one or more aspects described herein.

As mentioned above, aspects described herein relate to sharing data with applications installed at computing devices. Additional aspects described herein relate to sharing files based on an enterprise mobility management system, or a management system for cloud-based or remote access services. In connection with these aspects, and others, FIG. 7 depicts an example block diagram for sharing a file, or other data, with various computing devices. In FIG. 7, a simplified example network environment 700 is illustrated. Devices 710-730 may transfer or share data among themselves. The example network environment 700 includes components of the enterprise mobility management system described in connection with the above figures including, for example, FIG. 5 and FIG. 6. In particular, the block diagram of FIG. 7 includes a gateway 740 (e.g., access gateway 560, gateway server 606); a file sharing service 745 (e.g., file sharing 568, SharePoint of FIG. 6, ShareFile by Citrix Systems); one or more devices 710-730 (e.g., device 502 of FIG. 5, device 602 of FIG. 6, device 240 of FIG. 2, device 103, 107 or 109 of FIG. 1, device 411-414 of FIG. 4, or the like); and one or more network storage locations 735. The various devices and components of the example network environment 700 are in communication with each other via one or more networks 705. Certain devices and components may communicate with each other via tunnels (e.g., device 710 may communicate with the gateway 740 via a tunnel similar to 550 of FIG. 5 or tunnel 618 of FIG. 6) or via other secure communication methods (e.g., encryption).

Devices 710-730 may include various types of computing devices including mobile devices, personal computers, tablet computers, laptop computers, and the like. Devices 710-730 may include one or more devices that are capable of accessing enterprise resources (e.g., resources 504 of FIG. 5; resource 608 of FIG. 6) or enterprise services (e.g., services 508 of FIG. 5; service 609 of FIG. 6) via the gateway 740. For example, device 710 may be configured similar to device 502 of FIG. 5 or device 602 of FIG. 6, and may access enterprise resources or enterprise services via the gateway 740. Devices 710-730 may include one or more devices that are executing one or more applications that enable access to cloud-based services or remote access services (e.g., via execution of a Citrix Receiver by Citrix Systems and/or an HDX Engine by Citrix Systems). Each of devices 710-730 may be configured as part of an enterprise mobility management system similar to the systems described in connection with FIGS. 5 and 6, and/or each of devices 710-730 may be configured to access cloud-based or remote access services. The cloud-based or remote access services may be operated by a management system similar to the system of FIG. 4.

The one or more network storage locations 735 may be a cloud-based network storage. For example, the one or more network storage locations 735 may include a cloud-based network storage similar to cloud computing environment 400 of FIG. 4. The one or more network storage locations 735 may include a network-attached storage (NAS). The network storage location may be accessed via a gateway (access via the gateway 740 not shown) or may be accessed via a different network, such as the Internet. The NAS may, for example, be an enterprise resource accessible via the gateway 740 or a third-party or remotely-accessed NAS.

The file sharing service 745 (e.g., file sharing 568 of FIG. 5; SharePoint of the resources 608 of FIG. 6; or a ShareFile enterprise service) may provide one or more services or resources for sharing files. For example, the file sharing service 745 may, based on each device's usage of cloud-based services, remote access services, enterprise resources or enterprise services, maintain a record of each device 710-730. For example, the file sharing service 745 may maintain or otherwise store a data record that, for each device, includes an identifier of the device (e.g., an Internet Protocol (IP) address of the device, a media access control (MAC) address of each device), and an identifier of one or more accounts associated with the device or the user (e.g., a phone number for the device, an email address for a user associated with the device, or a mapping of an identifier for a user to an account with the file sharing service 745). This record may, for example, allow for the file sharing service 745 to determine associations between a device and a user or an account (e.g., an account for the cloud-based services, the remote access services, the enterprise resources and/or the enterprise services). The file sharing service 745 may also maintain a record of each network storage location 735. For example, the file sharing service 745 may maintain or otherwise store a data record that, for each network storage location, includes an identifier of the network storage location (e.g., an IP address of the network storage location). This record may, for example, allow for the file sharing service 745 to determine potential network locations where a file or other data may be available or otherwise stored. In this way, the file sharing service 745 may be able to communicate with those network locations to determine where a file or other data is available or is otherwise stored. A file or data being available or otherwise stored at a network location may include the file or data being locally stored by a computing device at the network location (e.g., a server at the network location may be in communication with a hard drive or other storage device that stores the file or other data; a computing device, such as a mobile phone or laptop, at the network location may store the file or other data within its memory, and the like).

As part of a device's 710-730 usage, a user may be interacting with an application, such as an email application, a video conferencing application, a voice conferencing application, or the like. As the user interacts with the application, the user may desire to share data, such as a document, video, or other file, with another user or another device. For example, if the user is currently operating device 710, the user may desire to share data with devices 715-730 or any users associated with the devices 715-730. To perform the sharing, the devices 710-730, the one or more network storage locations 735, and the file sharing service 745 may communicate with each other to, among other things, locate any device or network location where the data is available or otherwise stored; determine which, if any, devices or network locations are capable of sending the data to one or more of the devices 715-730; and to store the data such that it is accessible to one or more applications of the devices 715-730. The one or more applications may be of the same type as the application of the device 710. For example, if the user of device 710 was using an email application when the user indicated to share the data, the data may, after being shared, be accessible to an email application of devices 715-730. However, the types of the one or more applications may be selected by a user of the device 710. For example, the user of device 710 may be using a video conferencing application and may have selected to share the data with an email application of devices 715-730.

Additional details and variations of the depicted arrangement will be discussed below in connection with the remaining figures and, in particular, in connection with the FIGS. 8A-8E, and 9. Moreover, the example network environment 700 depicts only one example arrangement of devices and components. Many other variations are possible. For example, the devices 710-730 may include other types of computing devices than is depicted in FIG. 7 and/or may include additional or fewer devices than is depicted in FIG. 7.

FIGS. 8A-8E illustrate an example flow where, based on usage of an application at a computing device (e.g., device 710), data is shared with various other computing devices (e.g., devices 715-730). For simplicity, the example flow of FIGS. 8A-8E is illustrated based on the network environment 700 of FIG. 7. In particular, the example flow of FIGS. 8A-8E includes the devices 710-730 (denoted respectively as first device 710, second device 715, third device 720, fourth device 725, and fifth device 730); one network storage 735*a* from the one or more network storage locations 735; and the file sharing service 745. The network storage 735*a* of FIGS. 8A-8E may be a device associated with a particular network storage location (e.g., a server or some other computing device that manages access to the network storage location). Any communication with the file sharing service 745 and the network storage 735*a* may be performed via the gateway 740 (not shown in FIGS. 8A-8E).

Figure 8A:
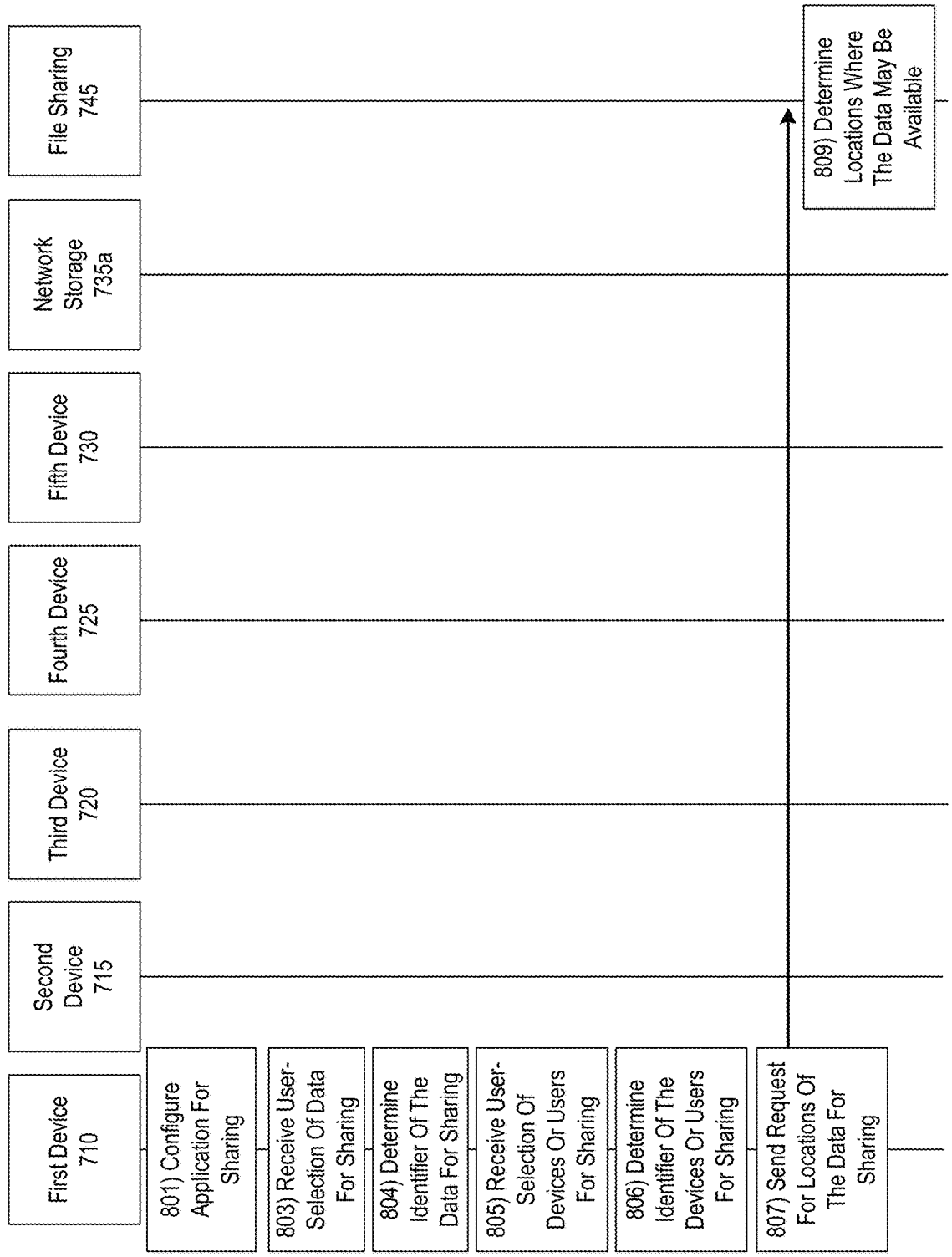
FIGS. 8A-8E illustrate an example flow where data is, based on usage of an application at a computing device, shared with various other computing devices.

In FIG. 8A, the flow begins with a process of initial configuration for the application. Thus, at 801, the first device 710 may configure an application for sharing. The application may be configured to provide various types of data services for a user. For example, the application may be an email application, a video conferencing application, or a voice conferencing application. Further, the application can be a managed application (e.g., application 610 of FIG. 6), a secure native application (e.g., application 514 of FIG. 5), or a secure remote application (e.g., application 522 of FIG. 5). The configuration of the application may be based on the installation of a module or plug-in associated with the file sharing service 745. The module or plug-in may be configured with an application programming interface (API) that is configured as an interface to the file sharing service 745, one or more secure containers on the device 710 (e.g., container 528 of FIG. 5, vaults 616 of FIG. 6), and/or other component of the example network environment 700 (e.g., gateway 740). The module or plug-in may modify a user interface of the application so that an option for sharing files, based on the file sharing service 745, is displayed (e.g., an icon in a toolbar, or a menu of pull-down options).

The configuration may require a user to log-in to the file sharing server 745 or otherwise authenticate the first device 710 to the gateway 740. The configuration may result in the file sharing server 745 generating, for the first device 710, a data record that includes an identifier of the first device 710 (e.g., an IP address of the first device 710) and an identifier of one or more accounts associated with the device or the user (e.g., an email address for the user). After configuration of the application, a user, via the first device 710 and based on interactions with the application, may be able to initiate one or more processes that causes data to be shared with other devices. There are various types of data and applications that could be used as part of a sharing process. For example, a user of the first device 710 may, based on interactions with an email application, be able to share a file with other email applications of the devices 715-730. As another example, a user of the first device 710 may, based on interactions with a video conferencing application, be able to share video and/or audio data with other video conferencing applications of the devices 715-730. Upon completion of the one or more sharing processes, one or more applications of the other devices may have access to the shared data. The one or more applications may be of the same type as the application of the first device 710 (e.g., if the user interacts with an email application, data may be shared with email applications on other devices). A similar configuration, or alternative method of configuring the API, may be performed at each of the devices 715-730 and the network storage 735*a*.

At 803 and 805, the user may indicate what data is to be shared (referred to below as "data for sharing" in connection with FIGS. 8A-8E) and any destinations for the shared data (referred to below as "devices or users for sharing"). In particular, at 803, the first device 710 may, based on one or more first user interactions with the application, receive a first user selection of data for sharing. The first user selection may indicate a particular set of data that is to be shared including, for example, one or more documents, one or more data files (e.g., audio, video, etc.), and the like. The data may be stored in a secure container of the first device 710 (container 528 of FIG. 5, vaults 616 of FIG. 6), or in a network storage location associated with the file sharing service 745 (e.g., a ShareFile repository). For example, the user may, via a touch screen or mouse and displayed mouse pointer, scroll through a listing of files or other data that are shared and/or stored by the first device 710. As the user scrolls through the listing, the user may, via the touch screen or the mouse and displayed mouse pointer, select an entry for each file or other data that they intend to share. Once all desired files or other data have been selected, the user may, via the touch screen or the mouse and displayed mouse pointer, select a button indicating the first user selection of data for sharing is complete.

At 804, the first device 710 may, based on the first user selection of the data for sharing, determine an identifier of the data for sharing. The identifier of the data for sharing may include one or more file names corresponding to the data for sharing (e.g., if the data for sharing includes 2 documents, the identifier of the data for sharing may include the file name of the 2 documents). The identifier of the data for sharing may include version information of the data for sharing. The identifier of the data for sharing may include an indication of an application type (e.g., an indication of an email application, an indication of a video conferencing application, etc.) that the user of the first device 710 interacted with to perform the user selections of 803 and 805.

At 805, the first device 710 may, based on one or more second user interactions with the application, receive a second user selection of devices or users for sharing. For example, the first device 710 may store a listing of all devices and/or users that can be shared with based on the file sharing service 745 (e.g., a listing of devices the user is authorized to share with, a listing of devices serviced by the file sharing service 745, a listing of other users the user is authorized to share with). The first device 710 may, via the module or plug-in of the application, allow the user to view the listing and indicate one or more selections of devices or users. The selections from the listing may form the second user selection. Thus, the second user selection may indicate one or more destination devices and/or one or more other users that the user intends to share the data with. For purposes of remaining portion of the example flow of FIGS. 8A-8E, the user of the first device 710, based on interactions with the application, will be assumed to have selected devices 715-730 for sharing.

At 806, the first device 710 may determine an identifier of the devices or users for sharing. This determination may be based on the second user selection of step 805 (e.g., the second user selection may indicate or be otherwise associated with the identifier of the devices or users for sharing. The determination may also be based on application information of the first device 710 (e.g., a contact list of an email application, attendee list for an active conference of a video conferencing application), one or more additional prompts for information from the user (e.g., a prompt requesting an email address of a user or phone number of a device); and/or one or more requests to the file sharing service 745 (e.g., a request to map the devices or users for sharing of the second user selection to the identifiers for those devices or users). The identifier of the devices or users for sharing may include an identifier for each device for sharing and/or for each user for sharing. An identifier of a device for sharing may include an IP address of the device or other identifier. An identifier of a user for sharing may include an email address or other identifier.

At 807, the first device 710 may send a request for locations of the data for sharing. The request may be sent, via the gateway 740, to the file sharing service 745. The request may include the identifier of the data for sharing. The request may include the identifier of the devices or users for sharing. The request may also include an identifier of the first device 710 (e.g., an IP address or other identifier of the first device 710), an identifier of the user associated with the first device 710 (e.g., an email address or other identifier of the user of the first device 710), or an identifier for a file sharing account associated with the user of the first device 710. The request may initiate or cause performance of one or more sharing processes. For example, based on the request, a sharing process may be performed by each of the devices 715-730 that, once complete, results in the data being shared with the devices 715-730.

At 809, the file sharing service 745 may, based on the request for locations of the data for sharing, determine one or more locations where the data for sharing may be available or stored. This determination may be based on one or more data records managed by the file sharing service 745 and the request for locations of the data for sharing. For example, the file sharing service 745 may determine, based on the request for locations of the data for sharing, one or more file sharing accounts. A file sharing account may be associated with the same identifier of the devices or users for sharing, which are found within the request for locations of the data for sharing. Alternatively or additionally, a file sharing account may be determined based on a mapping from the identifiers for the devices or users found within the request for locations of the data for sharing.

Continuing the example where the user of the first device 710 intends to share the data with the devices 715-730, the file sharing service 745 may, determine a file sharing account for each user that is associated with the devices 710-730. For example, if devices 710-730 are associated with five different users, the one or more file sharing accounts may include a file sharing account for each of the five different users. Based on the one or more file sharing accounts, the file sharing service 745 may determine storage locations associated with the one or more file sharing accounts. For example, for each file sharing account, the file sharing service 745 may have established one or more local storage locations (e.g., storage local to the file sharing service 745 or local to the enterprise where the file sharing service 745 is located), one or more network storage locations 735 (e.g., a cloud-based storage location, or NAS), and/or one or more device storage locations (e.g., one or more devices 710-730 may be configured to store data associated with a file sharing account). The data for sharing may be available or stored in each of the storage locations. Thus, the file sharing service 745 may determine that the one or more locations where the data for sharing may be available or stored is associated with the one or more file sharing accounts. Continuing the example where the user of the first device 710 intends to share the data with the devices 715-730, the file sharing service 745 may, based on the one or more file sharing accounts associated with the devices 710-730, determine that the one or more locations where the data for sharing may be available or stored includes devices 710-730 and a network storage 735*a*.

Figure 8B:
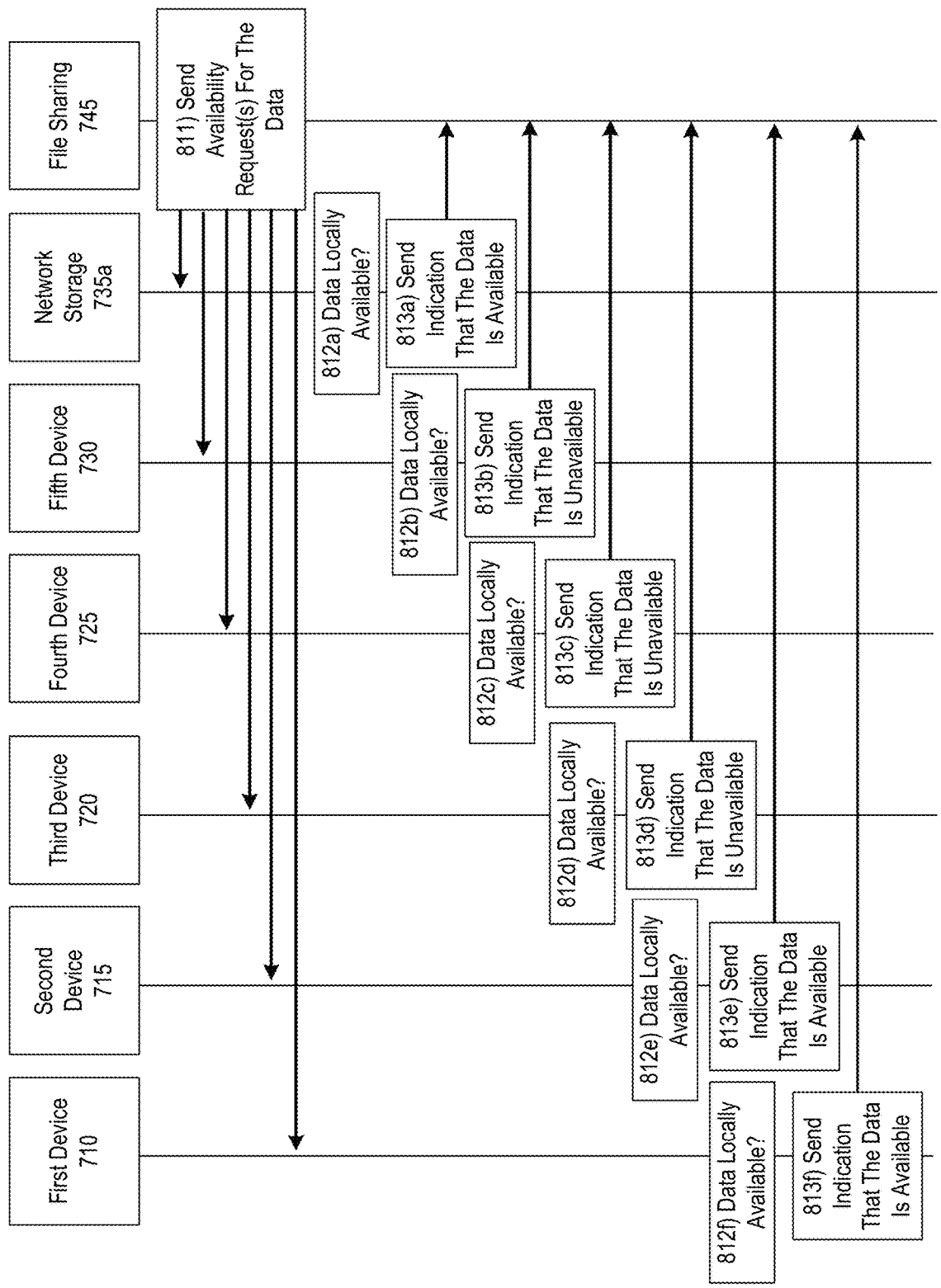

Continuing the example flow at 811 of FIG. 8B, the file sharing service 745 may send, to each of the one or more locations where the data for sharing may be available or stored, an availability request for the data for sharing. As indicated in the example flow of FIG. 8B, the file sharing service 745 may, based on the one or more locations where the data for sharing may be available or stored including devices 710-730 and a network storage 735*a*, send an availability request to each of the second device 715, the third device 720, the fourth device 725, the fifth device 730, and the network storage 735*a*. The availability request may include an identifier of the data for sharing. The availability request may include an identifier of the first device 710 as an indication that the first device 710 initiated the sharing process and is to receive confirmation upon completion of the sharing process. Alternatively or additionally, the availability request may include a hash based on the data for sharing. For example, the availability request may include a hash of the actual data for sharing, a hash of the one or more file names of the data for sharing, and/or a hash of the version information of the data for sharing. The hash may be determined by the file sharing service 745 (e.g., a Merkle-Damgård (MD) hash function such as MD5; a Secure Hash Algorithm (SHA) such as SHA-1, SHA-256; or the like).

Based on receiving an availability request, at 812*a*-812*f*, each of devices 710-730 and the network storage 735*a* may determine whether the data for sharing is locally available or locally stored. For example, the first device 710, based on receiving an availability request may determine whether the computing device stores the data for sharing in a secure container (e.g., container 528 of FIG. 5), a local data vault (e.g., vault 616 of FIG. 6) or some other local repository associated with the file sharing service 745 (e.g., a local file repository for ShareFile). This determination may be based on searching the containers, vaults and other repositories for data matching or otherwise associated with the identifier for the data for sharing. For example, if the availability request identifies the data for sharing as a document file with a file name of "abc.txt", the first device 710 may search for files having a name "abc.txt" and, if a match is found, the first device 710 may determine that the data for sharing is locally available. As another example, if the availability request includes a hash of the document file with a file name of "abc.txt", the first device 710 may search for files that, when hashed, match the hash of the document file. If a match to the hash is found, the first device 710 may determine that the data for sharing is locally available. Devices 715-730 and the network storage 735*a* may perform a similar determination. For purposes of the example flow of FIGS. 8A-8E, it is assumed that the data for sharing is locally available at or stored by the first device 710, the second device 715, and the network storage 735*a*. Any of these devices may be a source of the data for sharing. The data for sharing is unavailable or not stored at the third device 720, the fourth device 725, and the fifth device 730. These devices are to receive the data for sharing from one or more sources.

At 813*a*-813*f*, each of devices 710-730 and the network storage 735*a* may, based on the determination of whether the data for sharing is locally available or locally stored, send an indication as to whether the data for sharing is available or stored. Each indication may be sent to the file sharing service 745. Continuing the example where the data for sharing is locally available or stored at the first device 710, the second device 715, and the network storage 735*a*, the depictions in the example flow, at 813*a*-813*f*, indicate that the data for sharing is locally available or locally stored at the first device 710, the second device 715 and the network storage 735*a*. Further, the depictions in the example flow, at 813*a*-813*f*, indicate that the data for sharing is not locally available or not locally stored at the third device 720, the fourth device 725, and the fifth device 730.

Figure 8C:
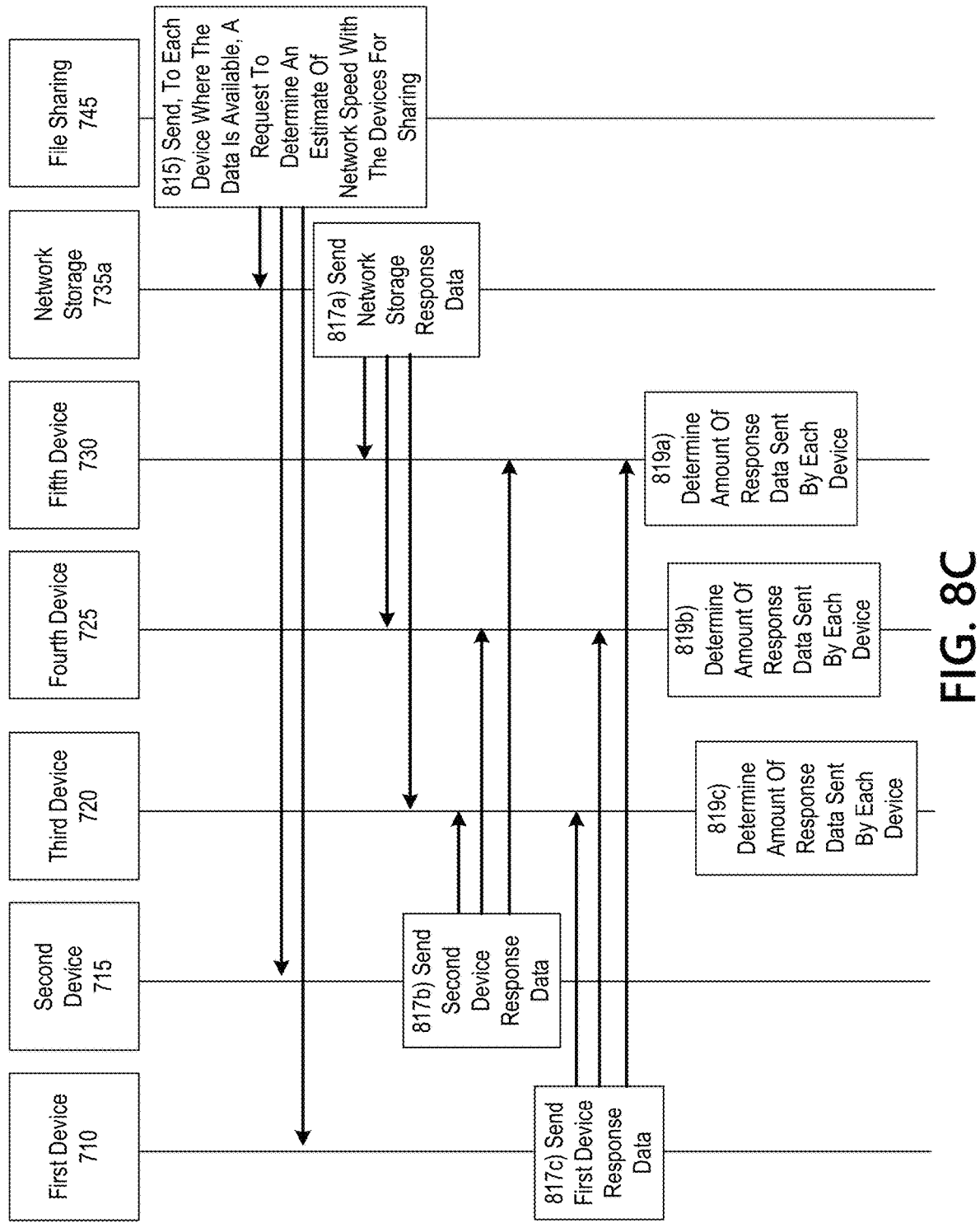

Continuing the example flow at 815 of FIG. 8C, the file sharing service 745 may send, to each device where the data for sharing is locally available or locally stored, a request to determine an estimate of network speed with the devices for sharing. Once determined, the estimate of network speed may be used to determine which of the devices can, based on current network conditions, send the data for sharing faster or more optimally. These requests may be based on the indications received at 813*a*-813*f*. For example, the file sharing service 745 may, based on the indications received at 813*a*-813*f*, determine which devices indicated that the data for sharing is unavailable or not locally stored. These devices will need to be sent the data in order to complete the sharing successfully. The file sharing service 745 may, based on the indications received at 813-813*f*, determine which devices indicated that the data for sharing is locally available or locally stored. One or more of these devices will need to send the data to the other devices that do not have the data locally to complete the sharing successfully, and which of these devices will send the data may be determined based on an estimate of network speed. To initiate the process, the requests to determine an estimate of network speed may be sent to each device where the data for sharing is locally available or locally stored. Continuing the depicted example of 813*a*-813*f* where the data for sharing is locally available or locally stored at the first device 710, the second device 715 and the network storage 735a, the file sharing service 745 sends a request to determine an estimate of network speed to the first device 710, the second device 715, and the network storage 735a. Each request may, based on which of the devices 710-730 indicated that the data for sharing is unavailable or not locally stored, include an identifier of the third device 720, an identifier the fourth device 725, and an identifier of the fifth device 730.

While 813a-813f, and 815 are depicted as involving communications being sent to and/or from the file sharing service 745, variations to the depicted flow may be implemented. For example, instead of the file sharing service 745 receiving and/or sending the communications of 813a-813f, and 815, the first device 710 may receive and/or send the communications. In particular, the first device 710 may be sent the indications of 813a-813f, and the first device 710 may send the one or more requests of 815.

At 817a-817c, each of the first device 710, the second device 715, and the network storage 735a may, based on its received request to determine an estimate of network speed, send response data to each of the devices 710-730 that indicated that the data for sharing is unavailable or not locally stored. As depicted in the example flow of FIG. 8C and based on the data for sharing being locally unavailable or not locally stored at each of devices 720-730, the first device 710 sends response data to each of the fifth device 730, the fourth device 725, and the third device 720; the second device 720 sends response data to each of the fifth device 730, the fourth device 725, and the third device 720; and the network storage 735a sends response data to each of the fifth device 730, the fourth device 725, and the third device 720.

The response data may be sent for a threshold amount of time (e.g., 2-3 seconds) and then the response data may stop being sent. The data may be sent for the threshold amount of time so that a device receiving the response data is able to estimate current network conditions. For example, for the response data being sent from the first device 710, the first device 710 may first send response data to the third device 720 for 2 seconds; may stop sending response data to the third device 720 after expiration of the first 2 seconds; may begin sending response data to the fourth device 725 for the next 2 seconds; may stop sending response data to the fourth device 725 after expiration of the next 2 seconds; may begin sending response data to the fifth device 730 for the following 2 seconds; and may stop sending response data to the fifth device 730 after expiration of the following 2 seconds. The second device 715 and the network storage 735a may perform a similar process for sending of response data to the devices 720-730.

The response data may be dummy data (e.g., packets having randomized values in the payloads) or may be a portion, or a subset, of the data for sharing (e.g., packets having, in the payloads, one or more portions of the data for sharing). If the response data is a portion of the data for sharing, a device that receives the response data (e.g., each of the devices 720-730) may store payloads of the response data for later use (e.g., to lessen the amount of the data for sharing that will be transmitted).

At 819a-819c, each of the devices 720-730 may, based on the response data it received (e.g., the first device response data, the second device response data, and the network storage response data, as depicted in the example flow of FIG. 8C), determine, for each device that sent the response data, an amount of the response data that was sent by the device. The amount of the response data that was sent may form a basis for estimating current network conditions. For example, the third device 720 may, based on receiving the first device response data from the first device 710, determine a first amount of the first device response data (e.g., 4 kilobytes of response data was received from the first device 710); may determine, based on receiving the second device response data from the second device 715, a second amount of the second device response data (e.g., 10 kilobytes of response data was received from the second device 715); and may determine, based on receiving the network storage response data from the network storage 735a, a third amount of the network storage response data (e.g., 3 kilobytes of response data was received from the network storage 735a). The fourth device 725 may perform similar determinations and those determinations may result in amounts of response data that are different from those determined by the third device 720. For example, the fourth device 725 may determine that 12 kilobytes of response data was received from the network storage 735a; 11 kilobytes of response data was received from the first device 710; and 3 kilobytes of response data may have been received from the second device 725. The fifth device 730 may perform similar determinations and those determinations may result in amounts of response data that are different from those determined by the third device 720 and the fourth device 725. For example, the fifth device 730 may determine that 8 kilobytes of response data was received from the network storage 735a; 5 kilobytes of data was received from the second device 715; and 1 kilobyte of data was received from the first device 710.

Figure 8D:
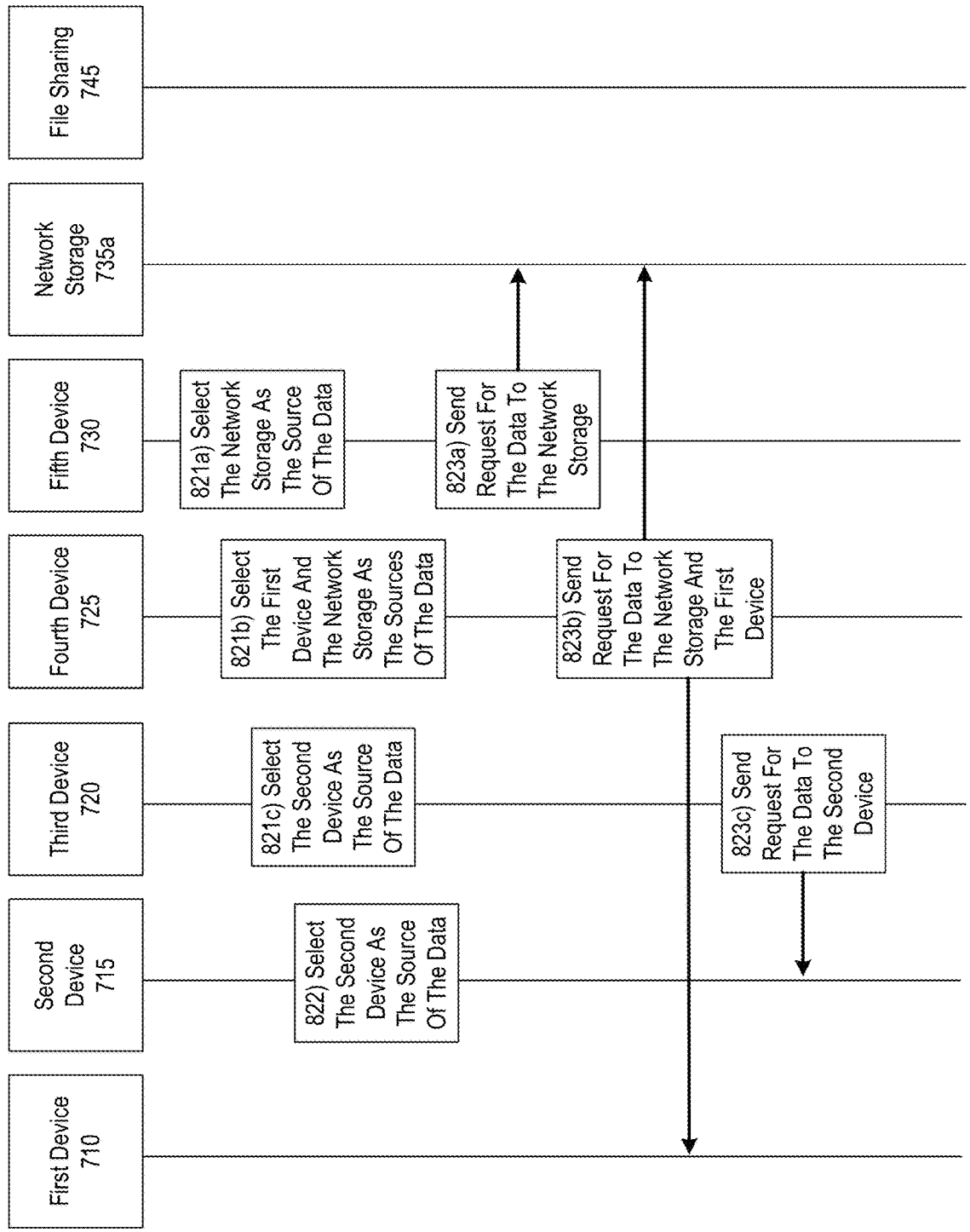

Continuing the example flow at FIG. 8D, at 821a-821c, the devices 720-730 may select which devices will be a source of the data for sharing. This selection may be performed based on comparing the amounts of response data that were determined. The comparisons may include comparing the amounts to one or more thresholds and/or comparing the amounts to each other. For example, the third device 720 may determine, based on the amounts of response data it determined at 819c, that the second device 715 is to be the source of the data for sharing. The second device 715 may be selected based on a determination that, out of the three amounts of response data (e.g., the first amount, the second amount and the third amount), the second amount of response data is above a threshold amount (e.g., 10 kilobytes is above a threshold of 8 kilobytes, while 4 kilobytes and 3 kilobytes are both less than the threshold). The fourth device 725 and the fifth device 730 may each perform similar selections and determinations. For example, the fourth device 725 may select, based on the three amounts of response data it determined at 819b, the first device 710 and the network storage 735a as the sources of the data for sharing. The first device 710 and the network storage 735a may be selected based on a determination that both the first device 710 and the network storage 735a are above a threshold amount of response data (e.g., 12 kilobytes and 11 kilobytes are both above a threshold of 10 kilobytes). The fifth device 730 may select, based on the three amounts of response data it determined at 819a, the network storage 735a as the source of the data for sharing. The network storage 735a may be selected based on a determination that, out of the three amounts of response data that the fifth device 730 determined, a greatest amount of response data was received from the network storage 735a (e.g., the 8 kilobytes received from the network storage 735a was greater than the 5 kilobytes and the 1 kilobytes that were respectively received from the second device 715 and the first device 710).

At 822, the second device 715 may select the second device as the source of the data. This selection may be performed based on the data for sharing being locally available or locally stored at the second device 715.

At 823a-823c, the devices 720-730 may send requests for the data for sharing. The requests may be sent to the devices selected to be the sources of the data for sharing and, thus, the requests may be based on the determinations performed at 821a-821c. For example, based on fifth device 730 selecting the network storage 735a as the source of the data for sharing, the fifth device 715 may send a request to the network storage 735a. Based on the third device 730 selecting the second device 715 as the source of the data for sharing, the third device 720 may send a request to the second device 715. Based on the fourth device 725 selecting the first device 710 and the network storage 735a as the sources for the data for sharing, a request may be sent to each of the first device 710 and the network storage 735a.

Each request for the data for sharing may include the identifier for the data for sharing. A request for the data for sharing may indicate which portions of the data for sharing are to be sent. For example, the fourth device 725 may determine that the first device 710 is to send a first portion of the data for sharing and that the network storage 735a is to send a second portion of the data for sharing. By having different devices send different portions of data, the data for sharing may be received faster than if the devices attempted to each send the entirety of the data for sharing. The two portions may be determined based on the corresponding amounts of response data that were received from the first device 710 and the network storage 735a (e.g., based on the network storage 735a sending more than the first device 710, the request to the first device 710 may indicate that the first device 710 is to send the first 40% of the data for sharing, and the request to the network storage 735a may indicate that the network storage is to send the final 60% of the data for sharing). As another example, the fifth device 730 may indicate a location within the data for sharing that the network storage 735a is to begin sending (e.g., a time stamp within video data at which to begin sending). The location within the data for sharing may be based on the amount of the data for sharing that was received as payloads of the response data (e.g., if 2 kilobytes of the data for sharing was received as payloads of the response data, the fifth device 730 may indicate, in its request to the network storage 735a, to begin sending the data for sharing at or after the initial 2 kilobytes of the data for sharing).

Figure 8E:
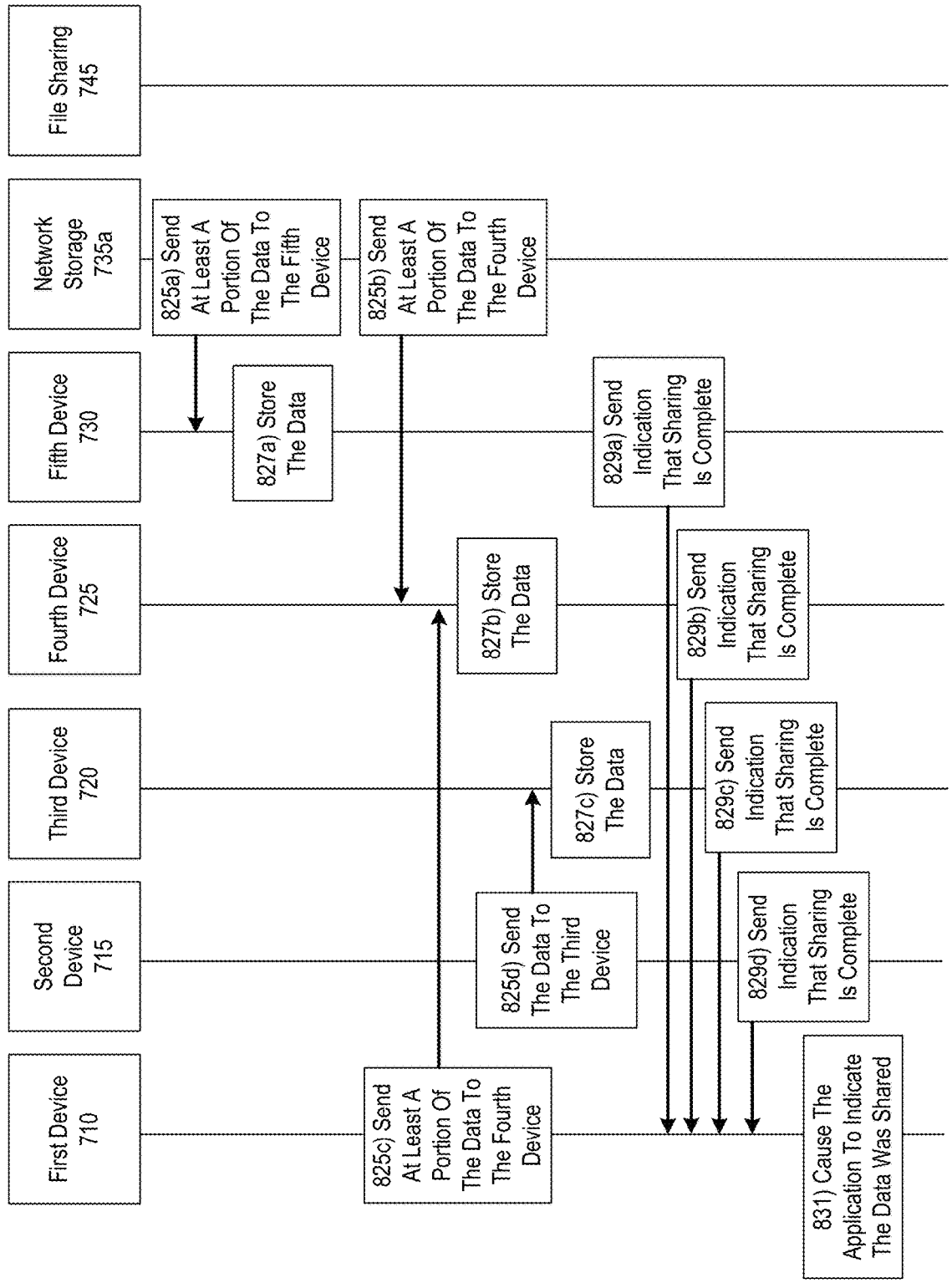

Continuing the example flow at FIG. 8E, at 825a-825d, the various sources of the data for sharing may send a portion of or an entirety of the data for sharing to the devices 720-730. The sending at 825a-825d may be performed based on receipt of the requests sent at 823a-823c. Further, whether a portion or an entirety of the data for sharing is sent may be based on whether the request indicates a portion of the data for sharing or a starting location of the data for sharing. If the request does not indicate which portions of the data for sharing are to be sent, an entirety of the data for sharing may be sent. As depicted in FIG. 8E, the network storage 735a, at 825a, may send at least a portion of the data for sharing to the fifth device 730 (e.g., a portion beginning at or after the initial 2 kilobytes of the data for sharing, based on the request sent at 823a). The network storage 735a may send at least a portion of the data for sharing to the fourth device 725 (e.g., the final 60% of the data for sharing, based on the request sent at 823b). The second device 715 may, at 825b, send an entirety of the data for sharing to the third device 720 (e.g., based on the request sent at 823c failing to indicate a portion of the data for sharing or a starting location of the data for sharing). The first device 710 may, at 825c, send at least a portion of the data for sharing to the fourth device 725 (e.g., the first 40% of the data for sharing, based on the request sent at 823b).

At 827a-827c, the devices 720-730 may store the data for sharing. The storing may be performed such that the data for sharing is accessible to an application that corresponds to the application of the first device 710 (e.g., the application configured at 801, and the application interacted with at 803 and 805). The determination as to which application needs access to the data for sharing may be based on the identifier for the data for sharing. For example, the extension of the file name may be used as a basis for storing the data for sharing such that it is accessible to applications compatible with the extension (e.g., if the data for sharing includes a text document with an extension of .txt, the data for sharing may be stored in a location accessible to a text editor that is capable of reading .txt files). As another example, the indication of the application type may be used as a basis for storing the data for sharing (e.g., if the indication of the application type indicates an email application, the data for sharing may be stored such that it is accessible to an email application of the devices 720-730). The location for storing the data for sharing may be based on the configuration of the devices 720-730 and any local policy of the devices 720-730. For example, if device 720 is configured similar to device 602 of FIG. 6 and the data for sharing is to be accessible to the mail application 610, a policy may determine whether the data for sharing is stored as part of the private data vault or the shared data vault (item 616 of FIG. 6). As another example, if device 725 is configured similar to device 502 of FIG. 5, and the data for sharing is to be accessible to the secure native application A 514, the data for sharing may be stored within the secure data container 528. As another example, the data for sharing may be stored within a local repository associated with the file sharing service 745 (e.g., a local file repository for ShareFile).

At 829a-829d, the devices 715-730 may send an indication that the sharing process is complete. The indication may be sent to the device that initiated the sharing process. Accordingly, based on 803-807 of the example flow being depicted by FIG. 8A as being performed by the first device 710 (and based on the availability request including the identifier of the first device 710), each of devices 715-730 may send an indication that the sharing process is complete. Additionally, based on completion of the sharing process, each of devices 715-730 may cause display of an indication of the data for sharing (e.g., a pop-up display window may indicate that a data file was shared and may include a selectable link to open the data file). In this way, a user of each device 715-730 may be informed of the data that was shared.

At 831, the first device 710 may cause the application (which was configured at 801 and interacted with the user at 803 and 805) to indicate that the data was shared. For example, the module or plug-in may cause display of a pop-up window or icon that indicates the data was shared and also indicate that devices 715-730 successfully completed the sharing process.

Figure 9:
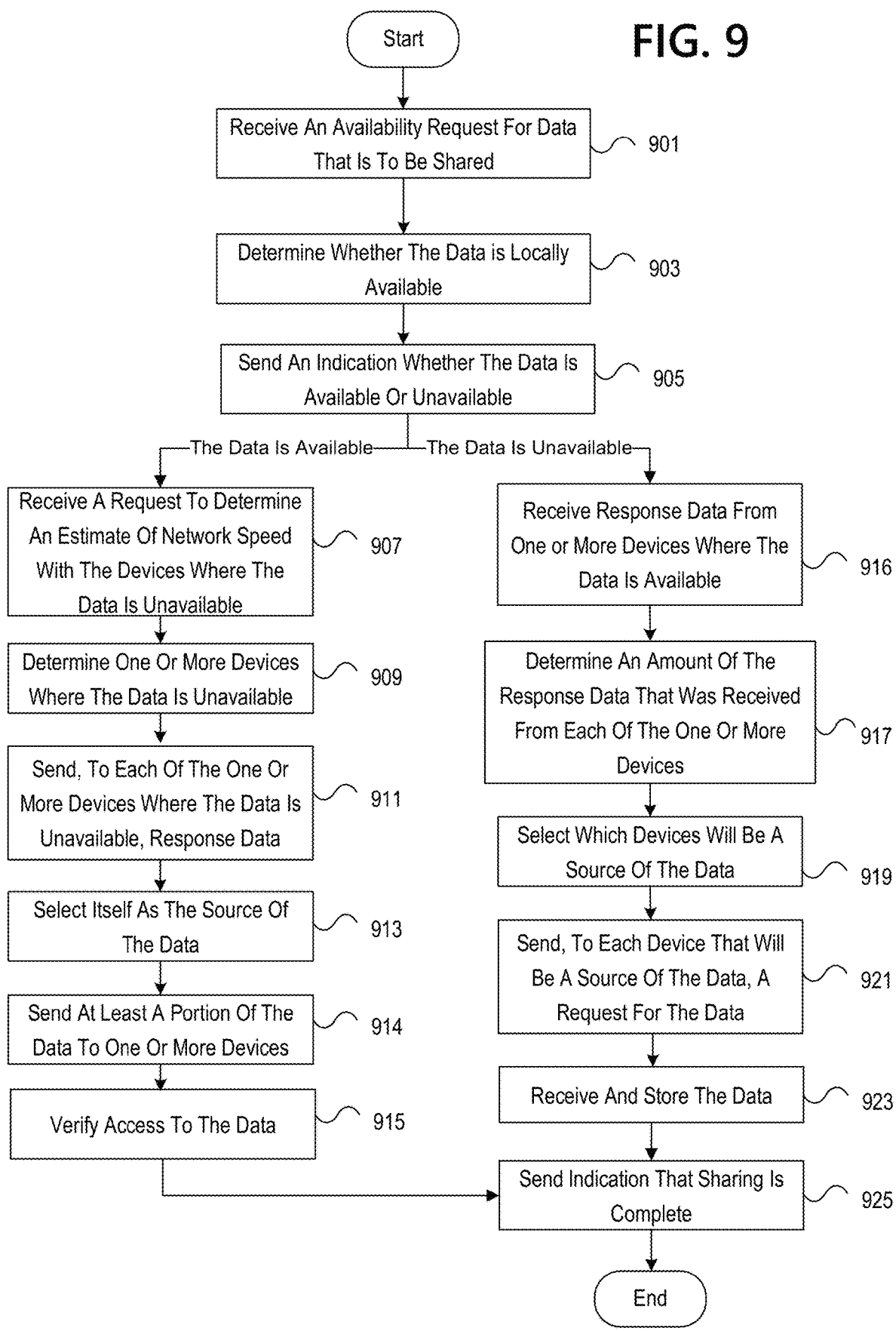
FIG. 9 illustrates an example method for causing data to be shared based on whether the data is available or unavailable at a computing device.

Based on the above-described example flow of FIGS. 8A-8E, data may be shared among various devices. The example flow provided a particular example where the first device 710 caused data to be shared with the devices 720-730. Based on the availability requests sent at 811 of the example, flow, various processes were performed at the devices 710-735 beginning at 813 (e.g., 813a-813f) and continuing until one or more sharing processes were complete. FIG. 9 provides additional details as to the processes that one of the devices 710-735 may perform beginning at 813 of the example flow. In particular, the method of FIG. 9 illustrates an example method for causing data to be shared based on whether the data is available or unavailable at a computing device. Comparing the method of FIG. 9 to the example flow of FIGS. 8A-8E, the method may have been performed by each of devices 715-730, and performance of the method may have begun at each of devices 715-730 after the one or more availability requests were sent. Further, comparing the method of FIG. 9 to the example flow of FIGS. 8A-8E, portions of the method may have been performed by each of the first device 710 and the network storage 735a (e.g., step 903 of FIG. 9 is similar to 812a and 812f).

At 901, a computing device (e.g., each of device 715-730) may receive an availability request for data that is to be shared with the computing device. The availability request may be similar to the request described in connection with 811 of FIG. 8B (e.g., the data that is to be shared with the computing devices is the "data for sharing" of FIGS. 8A-8E).

At 903, the computing device may, based on the availability request, may determine whether the data that is to be shared is locally available. The data may be locally available if the data is stored by the computing device or is otherwise locally accessible to the computing device (e.g., stored by a storage medium physically connected to the computing device). This determination may be performed similar to each of 812b-812e of FIG. 8B.

At 905, the computing device may send an indication whether the data is locally available or unavailable. The indication may be based on the determination of 903. Indeed, if the data is locally available to the computing device, the computing device may send an indication that the data is available to a file sharing service. If the data is not locally available, the computing device may send an indication that the data is unavailable to the file sharing service. The sending of the indication may be performed similar to each of 813b-813e of FIG. 8B.

Based on whether the data is locally available or locally unavailable, the computing device may perform different steps. As depicted in FIG. 9, if the data is locally available, the computing device may proceed to step 907 (e.g., as may be performed by the second device 715 in the example flow of FIGS. 8A-8E). As also depicted in FIG. 9, if the data is locally unavailable, the computing device may proceed to step 916 (e.g., as may be performed by each of devices 720-730 in the example flow of FIGS. 8A-8E).

At 907, the computing device may, based on the data being locally available at the computing device, receive a request to determine an estimate of network speed with devices where the data is unavailable. The request may be similar to the request described in connection with 815 of FIG. 8C.

At 909, the computing device may determine one or more devices where the data is unavailable. This determination may be performed based on the request received at step 907. For example, the request received at 907 may include an indication as to which devices indicated that the data is unavailable. Each of the indicated devices may be included as the one or more devices where the data is unavailable.

At 911, the computing device may send, to each of the one or more devices where the data is unavailable, response data. The sending of the response data may be performed similar to each of 817a and 817b of FIG. 8C.

At 913, the computing device may select itself as the source of the data. This selection may be performed based on the data being locally available to the computing device. The selection may be performed similar to 822 of FIG. 8D.

At 914, the computing device may send at least a portion of the data to one or more devices. Which devices are sent at least a portion of the data may be based on which of the devices that the computing device receives a request for data from. The request may be sent from other devices similar to 823a-823c of FIGS. 8A-8E. The sending of at least a portion of the data may be performed similar to 835a-825d of FIGS. 8A-8E.

At 915, the computing device may verify access to the data. For example, the computing device may verify that the data is stored in such a way that it is accessible to one or more applications of the computing device. For example, the verification as to which application needs access to the data may be based on an identifier for the data. For example, if identifier for the data includes a file extension, the extension may be used as a basis for identifying which application needs access to the data (e.g., if the data includes a text document with an extension of .txt, a text editor that is capable of reading .txt files may need to access the data). As another example, an indication of the application type, which may have been included in the request of 907, may be used as a basis for identifying which application of the computing device needs access to the data (e.g., if the indication of the application type indicates an email application, an email application needs access to the data). Based on which applications are identified, the location where the data is stored is analyzed to determine whether the applications have access. For example, if the computing device is configured similar to device 602 of FIG. 6 and the data is to be accessible to the mail application 610, the computing device may verify whether the private data vault or the shared data vault (item 616 of FIG. 6) stores the data. As another example, if the computing device is configured similar to device 502 of FIG. 5, and the data is to be accessible to the secure native application A 514, the computing device may verify that the data is stored within the secure data container 528. If the data is stored in a different location, the data may be moved, or copied, to a location that is accessible to the applications. As another example, the computing device may verify that the data is stored within a local repository associated with the file sharing service 745 (e.g., a local file repository for ShareFile).

At 916, the computing device may, based on the data being locally unavailable to the computing device, receive response data from one or more devices where the data is available. The response data may be similar to what is described in connection with 817a-817c of FIG. 8C (e.g., if the computing device is the third device 720, the computing device may receive response data from the network storage 735a, the second device 715, and the first device 710).

At 917, the computing device may determine an amount of the response data that was received from each of the one or more devices where the data is available. This determination may be performed similar to each of 819a-819c of FIG. 8C.

At 919, the computing device may select which devices will be a source of the data. This determination may be performed similar to each of 821a-821c of FIG. 8D, and may result in the determination of one or more devices as a source of the data.

At 921, the computing device may send, to each device that will be a source of the data, a request for the data. This sending may be performed similar to each of 823a-823c of FIG. 8D.

At 923, the computing device may receive and store the data. The receiving of the data may be performed as a result of a device sending at least a portion of the data, similar to what is described in connection with 825a-825c of FIG. 8E. The storing of the data may be performed similar to each of 827a-827c of FIG. 8E. By receiving and storing the data, the data may be accessed or otherwise used by one or more applications. For example, if the data is a file, the file may be opened based on a user interaction with an application; if the data is video or audio, the video or audio may be played based on a user interaction with an application.

At 925, the computing device may send an indication that the sharing process of the computing device is complete. This sending may be performed similar to 829a-829c of FIG. 8E.

The examples discussed in connection with FIGS. 8A-8E and 9 are only some of the many embodiments that may be realized based on the methods, block diagrams, and system architectures, etc., described throughout this disclosure.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, by a first computing device and from a second computing device of a plurality of computing devices in communication with the first computing device, an availability request for data that is to be shared with the first computing device;
determining, based on the availability request for data, that the data is unavailable at the first computing device;
receiving, based on the determination that the data is unavailable at the first computing device, a subset of the data from one or more devices of the plurality of computing devices;
selecting, based on an amount of the subset of the data received from the one or more devices, the one or more devices as a source of the data, the amount of the subset of the data being indicative of conditions of a network that communicatively couples the plurality of computing devices together; and
receiving, by the first computing device and from the one or more devices, at least a portion of the data to enable access to the portion of the data by an application of the first computing device.

2. The method of claim 1, wherein the portion of the data comprises a file;
wherein the application of the first computing device is an email application; and
wherein receiving at least the portion of the data comprises receiving the file to enable access to the file by the email application.

3. The method of claim 1, wherein the portion of the data comprises video data or audio data;
wherein the application of the first computing device is a conferencing application; and
wherein receiving at least the portion of the data comprises receiving the video data or the audio data to enable access to the video data or the audio data by the conferencing application.

4. The method of claim 1, wherein the amount of the subset of the data that was received from each of the one or more devices comprises a first amount of the subset of the data that was received from a first device and a second amount of the subset of the data that was received from a second device, and
wherein selecting the one or more devices is performed based on a comparison of the first amount and the second amount to a third amount of the subset that was received from a third device.

5. The method of claim 1, wherein selecting the one or more devices is performed based on the amount of the subset of the data that was received from each of the one or more devices being greater than a threshold amount of received data.

6. The method of claim 1, further comprising:
sending, to each device of the one or more devices, a request for the data, wherein receiving at least the portion of the data is performed based on the request for the data; and
sending, to the second computing device, an indication that a sharing process with the first computing device is complete.

7. The method of claim 1, further comprising:
storing, based on an encrypted data vault that is associated with an enterprise mobility management system or an encrypted data container that is associated with the enterprise mobility management system, the portion of the data, wherein the portion of the data is accessible to the application via the encrypted data vault or the encrypted data container.

8. The method of claim 1, further comprising:
storing, based on a local repository associated with a file sharing service, the portion of the data, wherein the file sharing service is of an enterprise mobility management system, and wherein the portion of the data is accessible to the application via the local repository.

9. One or more non-transitory computer-readable media storing executable instructions that, when executed, cause a first computing device to:
receive, from a second computing device of a plurality of computing devices in communication with the first computing device, an availability request for data that is to be shared with the first computing device;
determine, based on the availability request for data, that the data is unavailable at the first computing device;
receive, based on the determination that the data is unavailable at the first computing device, a subset of the data from one or more devices of the plurality of computing devices;
select, based on an amount of the subset of the data received from the one or more devices, the one or more devices as a source of the data, the amount of the subset of the data being indicative of conditions of a network that communicatively couples the plurality of computing devices together; and
receive, from the one or more devices, at least a portion of the data to enable access to the portion of the data by an application of the first computing device.

10. The one or more non-transitory computer-readable media of claim 9, wherein the portion of the data comprises a file;

wherein the application of the first computing device is an email application; and wherein the executable instructions, when executed, cause the first computing device to receive at least the portion of the data by receiving the file to enable access to the file by the email application.

11. The one or more non-transitory computer-readable media of claim 9, wherein the portion of the data comprises video data or audio data;

wherein the application of the first computing device is a conferencing application; and wherein the executable instructions, when executed, cause the first computing device to receive at least the portion of the data by receiving the video data or the audio data to enable access to the video data or the audio data by the conferencing application.

12. The one or more non-transitory computer-readable media of claim 9, wherein the amount of the subset of the data that was received from each of the one or more devices comprises a first amount of the subset of the data that was received from a first device and a second amount of the subset of the data that was received from a second device, and wherein the executable instructions, when executed, cause the first computing device to select the one or more devices based on a comparison of the first amount and the second amount to a third amount of the subset that was received from a third device.

13. The one or more non-transitory computer-readable media of claim 9, wherein the executable instructions, when executed, cause the first computing device to select the one or more devices based on the amount of the subset of the data that was received from each of the one or more devices being greater than a threshold amount of received data.

14. The one or more non-transitory computer-readable media of claim 9, wherein the executable instructions, when executed, cause the first computing device to:

send, to each of the one or more devices, a request for the data; and send, to the second computing device, an indication that a sharing process with the first computing device is complete.

15. The one or more non-transitory computer-readable media of claim 9, wherein the executable instructions, when executed, cause the first computing device to:

store, based on an encrypted data vault that is associated with an enterprise mobility management system or an encrypted data container that is associated with the enterprise mobility management system, the portion of the data, wherein the portion of the data is accessible to the application via the encrypted data vault or the encrypted data container.

16. The one or more non-transitory computer-readable media of claim 9, wherein the executable instructions, when executed, cause the first computing device to:

store, based on a local repository associated with a file sharing service, the portion of the data, wherein the file sharing service is of an enterprise mobility management system, and wherein the portion of the data is accessible to the application via the local repository.

17. A system comprising:
a first computing device comprising:
one or more first processors; and
first memory storing first executable instructions that, when executed by the one or more first processors, cause the first computing device to:

configure a first application for sharing based on a file sharing service;

receive, based on one or more first user interactions with the first application, a first user selection indicating data for sharing;

receive, based on one or more second user interactions with the first application, a second user selection indicating one or more devices or users for sharing; and send a request that causes performance of a sharing process; and a second computing device comprising:
one or more second processors; and
second memory storing second executable instructions that, when executed by the one or more second processors, cause the second computing device to:

receive, based on the request that causes performance of the sharing process, an availability request for the data;

determine, based on the availability request for data, that the data is unavailable at the second computing device;

receive, based on the determination that the data is unavailable at the first computing device, a subset of the data from one or more devices of a plurality of computing devices, wherein the plurality of devices are in communication with the second computing device;

select, based on an amount of the subset of the data received from the one or more devices, the one or more devices as a source of the data, the amount of the subset of the data being indicative of conditions of a network that communicatively couples the plurality of computing devices together; and receive, from the one or more devices, at least a portion of the data to enable access to the portion of the data by a second application of the first computing device.

18. The system of claim 17, wherein the portion of the data comprises a file;

wherein the first application is a first email application;

wherein the second application is a second email application; and wherein the second executable instructions, when executed by the one or more second processors, cause the second computing device to receive at least the portion of the data by receiving the file to enable access to the file by the second email application.

19. The system of claim 17, wherein the portion of the data comprises video data or audio data;

wherein the first application is a first conferencing application;

wherein the second application are both is a second conferencing application; and wherein the second executable instructions, when executed by the one or more second processors, cause the second computing device to receive at least the portion of the data by receiving the video data or the audio data to enable access to the video data or the audio data by the second email application.

20. The system of claim 17, wherein the second executable instructions, when executed by the one or more second processors, cause the second computing device to:

store, based on a local repository associated with the file sharing service, the portion of the data, wherein the file sharing service is of an enterprise mobility management system, and wherein the portion of the data is accessible to the application via the local repository.

* * * * *